United States Patent Office 3,734,796
Patented May 22, 1973

3,734,796
BONDED POLYESTER FIBROUS MATERIAL AND METHOD
Frank Lamb, Chadderton, Oldham, England, assignor to Ciba-Geigy Corporation, Ardsley, N.Y.
No Drawing. Original application Apr. 15, 1965, Ser. No. 448,247. Divided and this application Jan. 2, 1969, Ser. No. 801,901
Claims priority, application Great Britain, Apr. 22, 1964, 16,606/64
Int. Cl. E06b 9/26
U.S. Cl. 156—176
14 Claims

ABSTRACT OF THE DISCLOSURE

The disclosure covers bonded polyester fibers and a process for their preparation which consists contacting the outer surface of the fibers with a bonding agent selected from:

(a) a diester of a dicarboxylic acid and a monohydric compound, and
(b) a diester of a monocarboxylic acid and a dihydroxy compound.

The bonded fibers are useful as a packing and insulating material.

---

This application is a division of application Ser. No. 448,247, filed Apr. 15, 1965, now abandoned.

This invention relates to processes of bonding synthetic fibers to form a cohesive material, and in particular to processes of bonding polyester fibers to produce bonded polyester material useful as packing, filling, thermally insulating or electrically insulating materials, and also to the bonded material produced by this process.

The valuable properties of polyester fibers are well known but, although polyester wadding consisting of very short fibers produced in the weaving of the polyester fiber is already available, the commercial application of such wadding in packing, filling and insulating has hitherto been limited by the lack of a practicable process for bonding the wadding into a cohesive bonded polyester fiber composition.

It is, therefore, an object of this invention to provide a bonded polyester fiber material of improved mechanical strength which maintains its shape in a much better way than does known wadding of polyester staple fibers.

It is a further object of this invention to provide a bonded polyester material of improved mechanical strength in which the bonding points at tips and intersections of fibers are substantially free from bonding agents and in which the fibers at such bonding points are of substantially unimpaired mechanical strength.

These objects are attained by the bonded polyester fiber materials according to the invention which are obtained by my novel process comprising:

Contacting at least part of the outer surface of a mass of polyester fibers with an ester which is either the diester of a dicarboxylic acid with the same or two different monohydroxy compounds or the diester of a dihydroxy compound with the same or two different monocarboxylic acids, the hydroxy component and/or the carboxy component of the diester containing in the molecule an aromatic ring, at an elevated temperature and preferably at a temperature in the range of from 100° to 250° C., the temperature range from 150° to 250° C. being particularly preferred.

The mass of the polyester fibers may be contacted with the ester in any of a variety of ways. For instance, the mass may be steeped in the liquid ester, sufficient quantity of the ester being present to saturate the mass with the ester and/or to contact part or all of he outer surface of the fibrous mass. In another method, the mass of the polyester fibers may be sprayed with the liquid ester, to coat part or all of the outer surface of the mass, and if desired, part or all of the interstices among the constituent fibers, with the ester. Preferably, the fiber mass is contacted with the ester.

The optimum temperature for contacting with any specific diester depends to a certain extent on the nature of the diester used and on the method of application employed. Thus, when the ester is sprayed on to the polyester fibers, the treated fiber mass is advantageously maintained at an elevated temperature, preferably within the range of from 100° to 250° C., for a further period after all the ester has been sprayed on: this further period of heating may conveniently range from 5 to 30 minutes.

The term "polyester" as used in this specification and the appended claims means especially a polyester which is chemically poly-ethylene glycol terephthalate) and has a molecular weight in the range of from 8000 to 30,000 and preferably from 16,000 to 30,000, and melting point of approximately 262° to 265° C. Such polyesters include that known as Terylene. The Terylene or other terephthalate type polyester as defined above is preferably in the form of a mass of short fibers produced in the weaving of the polyester.

The ester used in the process may be, for example, a diester derived from a dicarboxylic acid having the formula HOOC—R$^1$—COOH and one or two monohydric alcohols or other monohydroxy compounds having the formula R$^2$—OH, or a diester derived from one or two monocarboxylic acids having the formula R$^3$—COOH or $$R^3O—COOH$$

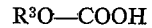

and a glycol or other dihydroxy compound having the formula HO—R$^4$OH; each of the groupings represented by R$^2$ and R$^3$ is an alkyl group containing from one to four carbon atoms, an aralkyl, especially a benzyl group, or an aryl, especially a phenyl group and each of the groupings represented by R$^1$ and R$^4$ is an alkylene group containing from one to four carbon atoms, an aradialkylene or an arylene, especially a phenylene group; and the hydroxy component and/or the carboxy component of the diester should contain an aromatic ring, preferably a phenyl ring.

When the diester is derived from a dicarboxylic acid, this acid can be an aliphatic dicarboxylic acid containing from three to six carbon atoms per molecule, for example, succinic acid, or an aromatic dicarboxylic acid, for example, phthalic acid or isophthalic acid. When the diester is derived from one or two monocarboxylic acids, the acid or each of the acids, can be an aliphatic fatty acid containing from three to six carbon atoms per molecule, but is preferably an aryl-substituted fatty acid, and especially a phenyl-substituted lower alkanoic acid, for example, phenylacetic acid. The hydroxy compound, or each hydroxy compound, from which the diester is derived may be an aliphatic alcohol, preferably an alkanol or alkanediol, containing from one to four carbon atoms per molecule but preferably contains in the molecule an aromatic ring, which may be, for example, phenyl, xylenyl, or other aryl group or benzyl, phenylethyl or other aralkyl group; where the hydroxy compound from which the diester is derived is a dihydroxy compound, this may be for example, resorcinol or other dihydroxyphenol.

Some of the diesters usable as bonding agent in the process according to the invention are liquids at room temperature, for instance dibenzyl phthalate and dixylenyl isophthalate. Others are solids at room temperature, for instance dibenzyl succinate (melting point 42° C.), di-($\beta$-phenylethyl isophthalate) melting point 55° to 56° C.), resorcinol bis-phenylacetate (melting point 58° to 60° C.) and dibenzyl isophthalate (melting point 82° to 83° C.). The process is carried out at a temperature sufficiently elevated to ensure that the diester is present as a liquid during the period of contacting the polyester fiber mass with the diester. When the diester is a solid, it is conveniently used in the process in the form of a dispersion, solution or emulsion in water or other expandable medium; when the medium is other than water, is is preferably a liquid diester also effective in the process.

The following non-limitative examples further illustrate the present invention. Parts by weight shown therein bear the same relation to parts by volume as do kilograms to liters; parts and percentages are expressed by weight unless otherwise stated. The temperatures are in degrees centigrade.

EXAMPLE 1

(A) 100 parts of staple fiber wadding of a poly-(ethylene glycol terephthalate) polyester having a molecular weight of about 20,000 to 25,000 and a melting point of 262–265° is placed in a vessel and 15 parts of dibenzyl isophthalate as bonding agent was added thereto, forming an ester-saturated mass therein.

The vessel was then placed in an oil-bath maintained at 220° for about 15 minutes at which substantially all bonding agent had been removed from the polyester mass, the contents of the vessel being continuously stirred. The same procedure was carried out separately at 175°, 190°, 200° and 210°.

The bonding agent was prepared as follows:

166 parts of isophthalic acid, 238 parts of benzyl alcohol, 200 parts by volume of xylene and 3.5 parts of tetrabutyl titanate as catalyst were heated together in a stirred reactor by boiling under reflux for 21.5 hours, the water produced during the esterification being continuously removed as formed.

The xylene and unreacted benzyl alcohol were then removed by distillation at subatmospheric pressure and the crude product was distilled in a nitrogen atmosphere at lower subatmospheric pressure. The distillate having boiling point range 212° to 226° at 0.3 to 0.4 millimeter of mercury pressure was collected and amounted to 156 parts representing a yield of 45% theoretical.

The product was dibenzyl isophthalate, a light yellow solid having melting point 82° to 83°. A sample of the product was further purified by dissolving in xylene and passing through activated alumina; the solvent present was then removed by evaporation.

(B) A quantity of fibrous Terylene polyester as used in Example 1(A) was placed in an open vessel and heated in an air oven at 200° for 20 minutes. Dibenzyl isophthalate was then sprayed over the fiber and the sprayed fiber was then heated for a further period of from 5 to 30 minutes. The same procedure was carried out separately at 175°, 190° and 210°.

In the procedure (A) as well as (B) there was obtained a bonded polyester fiber material of good mechanical strength which could be used as heat insulating plates.

When the procedure described in Example 1 is carried out using, instead of the diester used therein one of the following diesters: di-2-ethylhexyl phthalate, di-2-ethylhexyl adipate and di-n-butylsebacate, no bonding of the polyester fiber occurred.

EXAMPLE 2

100 parts of staple fiber wadding of a poly-(ethylene glycol terephthalate) polyester having a molecular weight of about 10,000 to 15,000 and a melting point at about 256° (produced as described in Koch's "Farbstofftabellen" 2nd Edition, January 1957 (was treated in the same manner as described in Example 1 with 18 parts of di-($\beta$-phenyl-ethyl-isophthalate) and similar results were obtained at bonding temperatures of 175°, 190°, 210° and 220° and by heating until substantially all bonding agent had been eliminated from the mass.

The bonding agent was prepared as follows:

256 parts of 2-phenylethanol, 166 parts of isophthalic acid, 42 parts of xylene and 3.7 parts of tetrabutyl titanate as catalyst were heated together with stirring by boiling under reflux for 5.5 hours, the water produced during the esterification being removed continuously as formed. The initial and final reaction temperatures were 176°, and 218°, respectively. The reaction product, solidifying on cooling, was dissolved in 650 parts by volume of toluene and washed three times with 5% aqueous sodium hydroxide solution, small quantities of percipitated solids being removed by filtration. After washing four times with water, the organic layer was separated, freed from solvent by distillation at subatmospheric pressure and finally distilled in a nitrogen atmosphere at a lower subatmospheric pressure.

The product having boiling point range 261° to 265° at 1.5 millimeters of mercury pressure was di-($\beta$-phenylethyl isophthalate) (bis-2-phenylethyl isophthalate) which, after treatment with alumina as in Example 1, yielded 256 parts of the compound as a pale yellow solid, having melting point 55° to 56°.

EXAMPLE 3

Example 1 was repeated with 100 parts of the same "Terylene" material as used in Example 1 and with 16 parts of di-xylene isophthalate under the same conditions, and bonded polyester wadding of similar good properties suitable for heat and sound insulating partitions and the like was obtained.

The bonding agent was produced as follows:

166 parts of isophthalic acid, 285 parts of a commercially available mixture of xylenols (boiling point range 212° to 220° and consisting of the five isomeric 2:3-, 2:4-, 2:5-, 3:4-, and 3:5-dimethylphenols together with traces of 2:6-dimethylphenol and phenol, and some cresols), 46 parts of xylene and 5 parts of p-toluenesulphonic acid as esterification catalyst were heated together by boiling under reflux for 54 hours while stirring. Water produced in the esterification was continuously removed as formed. When the reaction was half complete, as determined by the quantity of water evolved, a further 5 parts of p-toluenesulphonic acid was added. The initial and final reaction temperatures were 192° and 220°, respectively.

The reaction product was allowed to cool, diluted with 400 parts by volume of toluene, washed three times with 5% aqueous sodium hydroxide and finally washed free of alkali with aqueous sodium chloride solution. Volatile material was removed by distillation at subatmospheric pressure and the product was distilled in a nitrogen atmosphere at a lower subatmospheric pressure to yield 274 parts of dixylenyl isophthalate as a viscous yellow liquid having boiling point range 210° to 235° at 0.2 to 1.0 millimeter of mercury pressure.

The procedures described in Example 1 were carried out using the diesters shown in the following table, in which the results achieved in bonding the polyester fiber are also shown.

| Example | Diester | Temperatures at which bonding is effected |
| --- | --- | --- |
| 4 | Resorcinol bis-phenyl acetate | At least 175° to 220°. |
| 5 | Dibenzyl phthalate | 210° to at least 220°. |
| 6 | Dibenzyl succinate | Do. |
| 7 | Dimethyl phthalate | 190° to at least 220°. |
| 8 | Resorcinol diacetate | 190° to 200°. |

Similarly, bonded polyester fiber material is obtained from Terylene polyester wadding as used in the preceding examples by following the procedure described therein and using as bonding agent equivalent amounts of one of the following: resorcinol diacetate, resorcinol bis-trichloroacetate, and hydroquinone diacetate.

I claim:

1. A process of producing bonded polyester fibers which comprises contacting at least part of the outer surface of a mass of staple fibers of the polyester with a bonding agent selected from the group consisting of
  (a) a diester derived from a dicarboxylic acid having the formula HOOC.R$^1$.COOH and from one to two monohydric compounds of the formula R$^2$.OH,
  (b) a diester derived from one to two monocarboxylic acids having the formula R$^3$COOH, and a dihydroxy compound of the formula HO.R$^4$.OH and
  (c) a diester derived from one to two monocarboxylic acids of the formula R$^3$O—COOH and a dihydroxy compound of the formula HO.R$^4$.OH, each of the groupings represented by R$^2$ and R$^3$ being a member selected from the group consisting of an alkyl group containing from one to four carbon atoms, an aralkyl and aryl group and each of the groupings represented by R$^1$ and R$^4$ being a member selected from the group consisting of an alkylene group containing from one to four carbon atoms, an aradialkylene and arylene group, and at least one of the alcohol moiety and the acyl moiety of the diester containing a phenyl ring, and heating the fibers and bonding agent while in contact with each other at a temperature in the range of from 100° to 250° C., until substantially all bonding agent has been removed from the fibers, thereby obtaining a bonded polyester fiber material.

2. A process as claimed in claim 1 wherein the mass of the polyester fibers is steeped in the liquid ester, sufficient quantity of the ester being present to saturate the mass with the ester.

3. A process as claimed in claim 1 wherein the mass of the polyester fibers is sprayed with the liquid ester on to at least part of the outer surface of the mass with the bonding agent.

4. A process as described in claim 1 wherein the bonding agent is dibenzyl phthalate.

5. A process as described in claim 1 wherein the bonding agent is dibenzyl isophthalate.

6. A process as described in claim 1 wherein the bonding agent is di-(β-phenylethyl isophthalate).

7. A process as described in claim 1 wherein the bonding agent is dixylenyl isophthalate.

8. A process as described in claim 1 wherein the bonding agent is dibenzyl succinate.

9. A process as described in claim 1 wherein the bonding agent is dimethyl phthalate.

10. A process as described in claim 1 wherein the bonding agent is resorcinol bis-phenylacetate.

11. A process as described in claim 1 wherein the bonding agent is resorcinol diacetate.

12. A process as described in claim 1 wherein the bonding agent is resorcinol bis-trichloroacetate.

13. A process as described in claim 1 wherein the bonding agent is hydroquinone diacetate.

14. Bonded polyester fibers consisting essentially of a mass of staple polyester fibers and a bonding agent selected from
  (a) a diester derived from a dicarboxylic acid having the formula HOOC.R$^1$.COOH and from one to two monohydric compounds of the formula R$^2$.OH,
  (b) a diester derived from one to two monocarboxylic acids having the formula R$^3$COOH, and a dihydroxy compound of the formula HO.R$^4$.OH and
  (c) a diester derived from one to two monocarboxylic acids of the formula R$^3$O—COOH and a dihydroxy compound of the formula HO.R$^4$.OH, each of the groupings represented by R$^2$ and R$^3$ being a member selected from the group consisting of an alkyl group containing from one to four carbon atoms, an aralkyl and aryl group and each of the groupings represented by R$^1$ and R$^4$ being a member selected from the group consisting of an alkylene group containing from one to four carbon atoms, an aradialkylene and arylene group, and at least one of the alcohol moiety and the acyl moiety of the diester containing a phenyl ring.

References Cited

UNITED STATES PATENTS

| | | | |
|---|---|---|---|
| 2,902,463 | 9/1959 | Johnston et al. | 156—332 UX |
| 2,931,749 | 4/1960 | Kine et al. | 156—332 X |
| 3,074,834 | 1/1963 | Matlin et al. | 156—332 X |
| 3,157,562 | 11/1964 | Kine et al. | 156—332 X |
| 3,252,848 | 5/1966 | Borsellino | 156—332 X |
| 3,337,382 | 8/1967 | Farago | 156—332 X |
| 3,378,424 | 4/1968 | Sawyer | 156—332 |

STEPHEN J. LECHERT, JR., Primary Examiner

U.S. Cl. X.R.

161—231; 156—180, 181, 296, 332